United States Patent [19]

Kelly

[11] 4,179,633
[45] Dec. 18, 1979

[54] MAGNETIC WHEEL DRIVE

[76] Inventor: Donald A. Kelly, 58-06 69th Pl., Maspeth, N.Y. 11378

[21] Appl. No.: 879,608

[22] Filed: Feb. 21, 1978

[51] Int. Cl.² .............................................. H02K 7/10
[52] U.S. Cl. ....................................... 310/80; 310/103
[58] Field of Search ................ 310/306, 80, 103, 68R; 60/641

[56] References Cited

U.S. PATENT DOCUMENTS

| 4,082,969 | 4/1978 | Kelly ..................................... 310/103 |
| 4,100,441 | 7/1978 | Landery ................................. 310/103 |

Primary Examiner—Donovan F. Duggan

[57] ABSTRACT

The permanent magnet wheel drive consists of two basic magnetic components, one large driven flat wheel containing a uniform series of identical magnet segments, and a second magnetic driving means comprising multiple oscillating magnetic couples of opposite identical magnet segments.

The magnetic mechanism simulates the action of a clock escapement mechanism in that the oscillating magnet couples uniformly oscillates between the wheel magnet segments to induce continuous wheel rotation.

All of the multiple oscillating magnet couples are oscillated by a motor(s) driven eccentric through a suitable gear reduction unit. The small D. C. motor(s) are powered by multiple arrays of silicon solar photovoltaic cells at some convenient rooftop location.

10 Claims, 4 Drawing Figures

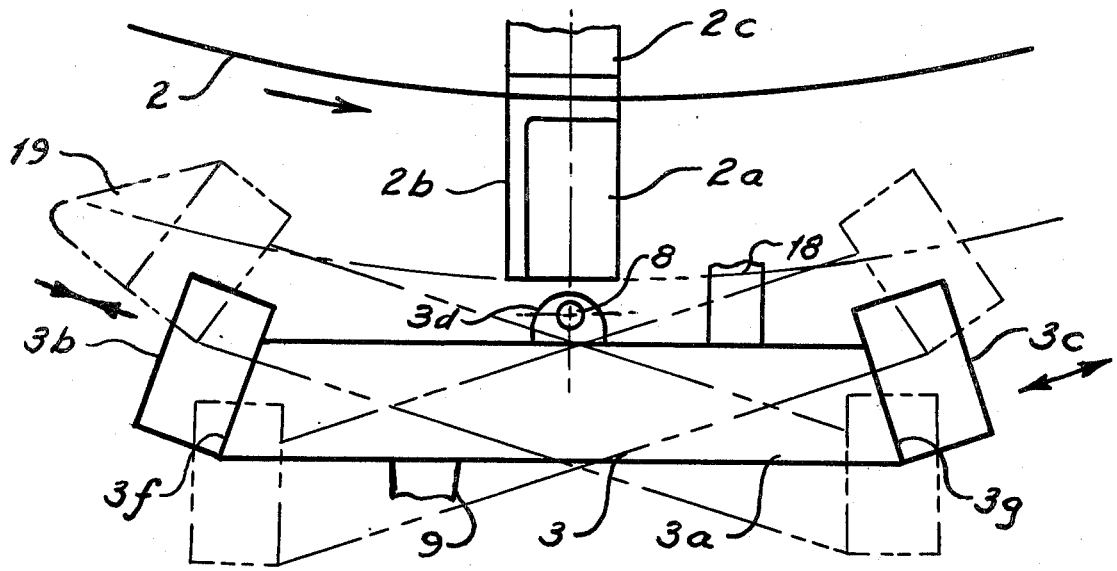
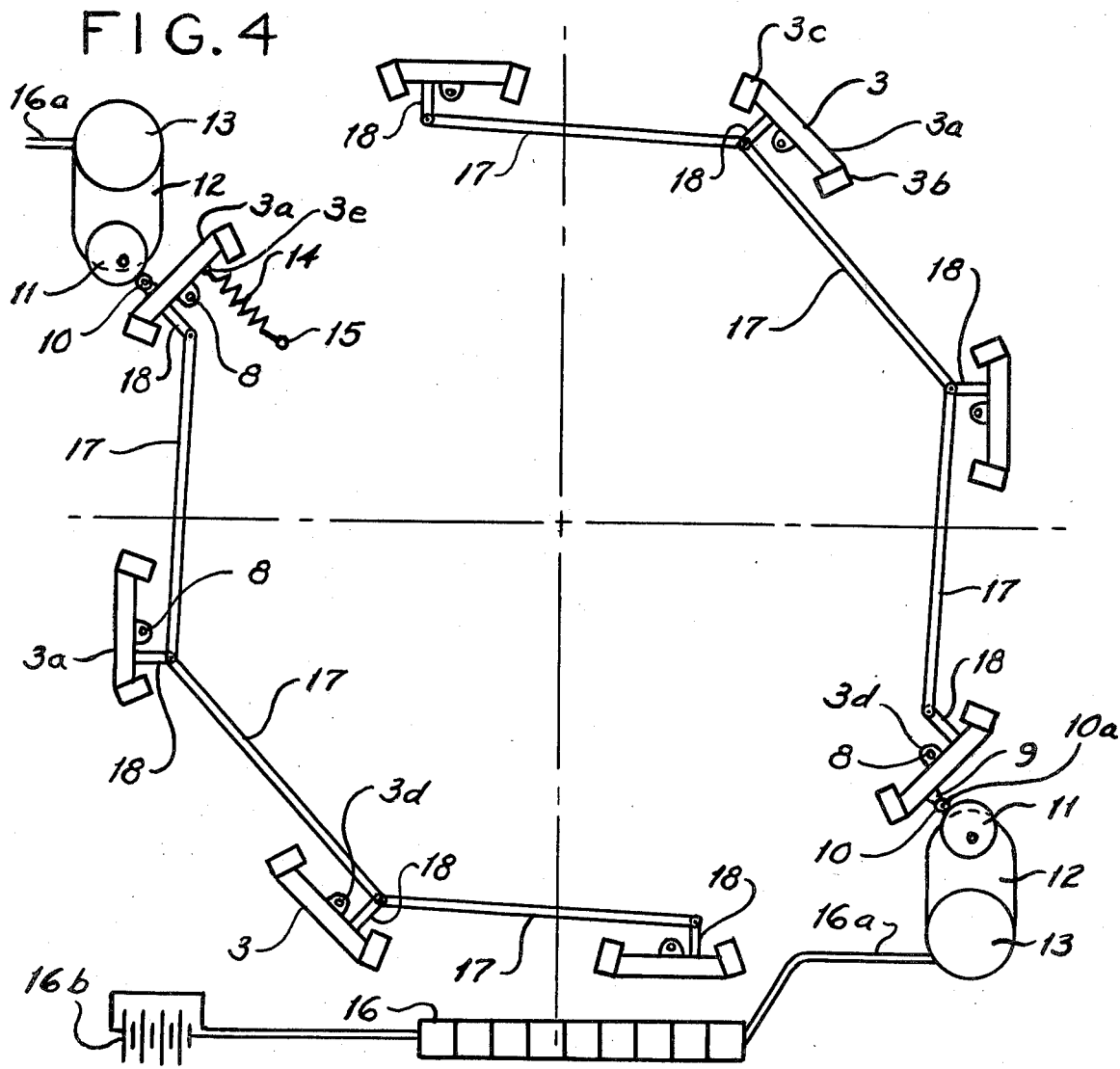

MAGNETIC WHEEL DRIVE

BACKGROUND OF THE INVENTION

At the present time the magnetic wheel drive has reached the stage of development where the oscillating magnet couples will rotate the magnetic segmented wheel when the oscillations is done manually. The wheel rotation is smooth and continuous when the manual oscillation is uniform and continuous, and the wheel speed may be increased as the oscillation rate is increased.

Since the adequate functioning of the magnetic/mechanical-conversion concept has now been proven with a working prototype, a practical and economical self and/or external oscillation means for the oscillating magnetic couples must now be developed. The magnetic wheel drive was originally designed to be self-actuated by means of a multi-lobe cam and push rod arrangement, but this approach has not been proven successful to date.

A disadvantage for the self-actuated type of magnetic wheel drive is that the wheel is locked-in with a low, fixed speed output which is dependant on the natural magnetic field interaction between the involved interacting magnet segments.

A mid-diameter direct displacement multi-lobe cam was used for the first prototype, but this did not work because of the high rotational resistance imposed by the high cam lobe angles. A peripheral, direct displacement multi-lobe cam was also tried but this was not successful because of the moderate and sufficient cam lobe resistance to push rod displacement.

Other cam lobe configurations are being planned and developed to make sure that no possible tradeoff to self-actuated mechanical oscillation is overlooked. Another possible approach to self-actuation for the magnetic wheel drive is by the application of a twin level magnetic commutator which is directly connected to the wheel drive shaft. The magnetic commutator sements alternately attract corresponding radial magnets on pull-rods which are pivoted on each of the oscillation plates of the magnetic couples.

While auto-actuation of the magnetic wheel units may be desirable for some self-contained power applications, the low, fixed speed output is not considered attractive and promising for a wide range of household power applications. Because of the inflexibility of speed output of the auto-actuated type of unit the, the development of a variable speed, externally oscillated type of wheel unit is required to meet the growing demand for alternate and auxiliary power means for many applications.

The matching of a large magnetic wheel drive and small solar powered D.C. electric motors is a nearly ideal arrangement since a single or series of small precision D.C. motors can be readily powered by modest arrays of silicon photovoltaic cells located at some convenient rooftop location. The small high efficiency, ball bearing D.C. motors are available which when connected to suitable gear reduction drives can revolve a simple eccentric at sufficient torque and variable speed to cause oscillation of a series of about four to six magnetic oscillating couples.

This series of magnetic oscillating couples will all be connected together with straight linkage to transmit the reciprocating motion from the driving oscillating shaft to the other oscillating shafts of the series. This is a more desirable multiple driving arrangement rather than separate small D.C. motors since synchronism is automatically assured, rather than more complex and less reliable electrical synchronization requirements. Because there is no locked-in synchronism for this type of external oscillation means, the multiple magnetic oscillation couples must be of the minimum interference type, in that they must not become jammed into the wheel magnet segments. Although the proper functioning of the magnetic wheel unit requires that the oscillating magnet couples must enter the wheel's magnet segment interference circle, deflection means must be added to all of the oscillation plates to insure that the continuously revolving wheel will readily by-pass all of the oscillating magnet couples.

The large magnetic wheel unit will consist of a basic non-magnetic wheel disc on which multiple high energy permanent magnet segments are equally spaced around the periphery or rim of wheel. The drive shaft of the wheel rotates on precision ball-bearings and may revolve in either a horizontal or vertical line. The wheel is the driven component of the magnetic wheel drive assembly, and is connected to the load or electrical generator.

The multiple oscillating magnet couples are the driving component of the wheel drive unit and consist of flat, non-magnetic oscillation plates on which identical high energy permanent magnets are secured on either side of these oscillation plates. The magnet segments are placed with opposite poles exposed at the sides, relative to each other so that a north-south pole couple reacts on the wheel's magnet segments. The driven wheel's direction of rotation depends on the polarity direction of the wheel's magnet segments in relation to the multiple oscillating magnetic couples.

The oscillating magnetic couples will make a full back and forth oscillation between two adjacent local wheel magnet segments so that an alternate "pull and push" effect is induced on the magnetic segmented wheel. The basic synchronism between the wheel's magnet segments and the multiple oscillating magnet couples closely simulates the action of a watch or clock escapement mechanism in respect to the natural "cogging" action between the functioning components.

This general magnetic wheel drive arrangement insures smooth and continuous rotation for the driven wheel with an optimum of magnetic energy interchange between the oscillation stations and the magnetic wheel because of near pole face to pole face exposure. It is now believed that this present type of magnetic wheel drive is approaching a theoretical maximum of conversion performance possible, especially when compared with other types of magnetic/mechanical arrangements such as magnetic worm and worm wheels, spur couples, mitre couples, and all types of inferior, linear magnetic devices.

The attractiveness of the basic magnetic wheel and oscillating couples is that a nearly ideal leverage factor is introduced in magnetic/mechanical conversion arrangements. Simply stated, considerably less energy is expended to oscillate the oscillating couples than is produced from the near pole face to pole face magnetic interaction between the functioning magnetic components.

The alternating and uniform "pull and push" force imposed by the oscillating magnet couples on the wheel magnet segments produces no direct back or counter force reaction on the driving oscillating magnet segments which is the master key for a useful and practical magnetic/mechanical conversion drive. The back or counter-reacting force on the oscillating magnet couples is taken directly by the fixed pivots of the oscillation plates, with a minimum of load penalty imposed on the oscillating magnet couples.

All other types of rotary magnetic/mechanical conversion devices, with the possible exception of the worm and worm wheel type, produce an undesirable back reaction force on the driving component and resulting ineffective performance. The magnetic worm and worm wheel units have not proven to be sufficiently worthwhile for commercial applications because of the very high permanent magnetic energy necessary and due to the low speed output of these mechanisms.

When configuration comparisons are made of all types of possible magnetic/mechanical conversion devices it will be noted that the combination of a magnetic wheel driven by multiple oscillating couples will stand out as a practical and useful permanent magnetic conversion arrangement. The incentive for the development of this magnetic wheel drive was the direct outgrowth of overall disappointing performance of solar energy conversion efforts and the frustrations encountered with component costs, conversion efficiency and a lack of suitable energy storage means. While solar energy is being widely hailed for its future potential as a viable alternate energy source, relatively few engineers speak out about relatively poor *overall* cost/effectiveness due to days-on-end of overcast skies during the winter months when the energy is most needed, especially in the northern latitudes of the U.S.

Because of the less-than-adequate solar energy conversion outlook for the vast majority of American homeowners, othere alternate, small scale, decentralized, energy sources must be explored and developed on a crash program basis. If this is not done within the next several decades we must accept the alternative of a greatly reduced standard of living because of the alarming rise in the rate of present energy costs.

This present magnetic wheel drive represents a practical hardward solution in applied permanent magnetism towards the development and commercialism of a decentralized, silent, fuel-free, household-sized alternate power system. While the power output from an individual magnetic wheel unit may be small, the power output is constant and does not generally depend on the intensity of an external energy source, as do present solar energy systems.

SUMMARY OF THE INVENTION

The magnetic wheel drive unit is comprised of a large driving wheel disc made of non-magnetic metal on which multiple permanent magnet segments are equally spaced around the rim of the wheel. The wheel drive shaft rotates on trunnion supported ball bearings and may revolve in nearly any conventional attitude, and may be made in any practical large diameter.

The multiple, identical oscillating magnet couples are the driving component of the wheel drive and consist of flat, non-magnetic plates on which identical, multiple permanent magnets are secured at both sides of the oscillation plates. The opposite magnet sets have opposite pole faces exposed at the sides relative to each other. The wheel's direction of rotation is determined by the identical polarity of all the wheel magnet segments relative to the oscillating magnet couples.

The oscillating magnet couple will make a full back and forth oscillation between local wheel magnet segments so that an alternate pull and push force is induced on the magnetic wheel. The relative synchronism between the wheel and the oscillating couples, which is similar to the action of a clock escapement-mechanism, must be maintained for continuous and smooth rotation of the wheel.

The external oscillation means for the multiple oscillating couples consists of solar powered D.C. motors which revolve eccentrics which are in contact with ball bearings mounted on the oscillation plates. Since the eccentrics must revolve at relatively slow speeds suitable gear reduction units must be utilized between the D.C. motors and the eccentrics.

In order to maintain proper synchronism between all of the oscillating magnetic couple stations, straight links must connect all of the driven oscillation shafts from the driving oscillation shaft. About four to five oscillation stations may be driven from one driver oscillation shaft so that a wheel drive with a large number of oscillation stations will require several D.C. motors to drive all of the other oscillation shafts.

It is important that the multiple, identical oscillation plates and their magnet couples be slightly shorter in width than the space between two adjacent wheel magnet segments, so that an optimum pull and push force is induced on the local wheel magnet segments. One side of the oscillating magnet couple "pulls" on the wheel's local P.M., and then the opposite side of the couple "pushes" the wheel's local, adjacent P.M. by the oscillation action on the oscillation plate caused by the rotation of the eccentric.

All of the oscillating magnet couples oscillate on stationary rods, or shafts, and all of the eccentrics and D.C. motor drives remain fixed on a base plate. The other ends of the oscillating rods or shafts must be supported by some form of bracket to keep the oscillation plates parallel to the wheel magnet segments. Each eccentric which displaces a ball bearing secured to arms on the oscillation plates must make one full 360 degree revolution within the angular displacement arc between two adjacent wheel magnet segments. Two small pivot brackets are secured at the extreme, non-magnetic ends of the oscillation plates to allow these plates to oscillate freely with a minimum of friction.

The basic rotational relationship between the magnetic oscilating couples and the magnetic segmented wheel will have a bearing on the gear reduction ratio required for the gear drive unit coupled to the small D.C. motors. Fairly rapid oscillation is necessary to maintain a reasonably acceptable wheel speed which will be required for most power applications. The size of the eccentrics which oscillate the oscillating magnet couples will be determined by the full oscillating arc required and mechanical advantage required by the oscillation plate to cause optimum rotation of the magnetic wheel drive unit.

Proper magnetic wheel drive functioning dictates that the pulling magnets of the oscillating couples must enter the wheel's interference circle within the mutual magentic field zone between the two local interacting magnets on the wheel's rim. Since the wheel will revolve continuously, the withdrawing phase of the "pulling" magnets brings the "pushing" magnets of the couple into the wheel's interference circle within the mutual magnetic field zone, for effective interaction with the adjacent wheel magnet segment.

All of the magnet segments on the oscillation plates which form the magnet couple must be in-line with the corresponding wheel magnet segments in order to maintain an optimum interaction between the functioning components.

Because there is no natural, lock-in synchronism for this type of magnetic wheel drive, the multiple magnetic oscillating couples must be of the minimum interference type, which consists of adding plastic deflectors to the oscillation plates to prevent the pulling magnets of the couple from jamming into the wheel magnet segments. Since the oscillating magnet couples must never jam into the wheel and stop its rotation, the plastic deflectors will allow the oscillation plates and magnet couples to be deflected away from all of the wheel magnet segments.

The permanent magnets selected for both components of the wheel drive must be uniformly identical and have the highest possible energy product or magnetic induction plus coercivity. Both of these magnetic properties will play a significant role in determining the true value of the magnetic wheel drive unit. At the present time the rare earth/cobalt permanent magnets offer the highest possible magnetic properties for this application, but their cost is very high and currently not considered cost effective for the magnetic wheel drive. Since costs will also play a major role in the competitive value of the wheel drive, the magnets selected must show the highest possible cost/effectiveness ratio, along with long operating life.

Rectangular ceramic P.M's with large flat pole faces are presently preferred for the wheel drive prototypes, and there is no theoretical limit to the size of both interacting components. A practical limit to the actual size of the components is imposed by weight and material cost restrictions plus available space, but nearly any practical number and size of uniform, identical magnets may be used to make up the magnetic wheel drive.

It will be advantageous to build up each wheel magnet station into clusters of up to about twelve to twenty four individual magnets which are arranged in lengths of four or five units and double or triple widths depending on the wheel diameter. A large diameter wheel unit is always desirable since the torque output for the wheel unit depends on the tangential magnetic force produced by all of the oscillating magnet couple stations multiplied by the wheel radius.

The large diameter wheel speed will be ralatively slow, in the 20 to 30 r.p.m. range, so that the wheel output speed must be stepped up to a useful 750 to 1200 r.p.m. speed range, by a belt drive arrangement. The magnetic wheel drive output is best adapted to run an electrical generator or alternator to produce electrical power for various household purposes.

An advantage to using silicon photovoltaic solar cells on an exposed rooftop location as a power source, is that they are capable of providing a partial E.M.F. under non-sunlight/overcast sky conditions. With full sunlight exposure the electrical energy produced will run the magnetic wheel drive at its maximum possible speed, with reduced sunlight levels producing a corresponding proportionate reduction in the wheel output speed.

A workable option exists for utilizing a greater number of silicon photocells than would be normally necessary for full sunlight operation. The number of cells selected would be capable of running the magnetic wheel drive at full speed under overcast sky conditions, with any excess full sunlight current bypassed to storage batteries. This option is a desirable arrangement since the wheel will be assured of full electrical input power each day, with battery power available to make up the loss from any dark daytime sky conditions.

The principal object of the invention is to provide the highest torque output for the large driven wheel from the lowest possible torque input for the multiple oscillating magnet couples, as a useful power step-up means for electrical generating applications.

Another object of the invention is to provide a step-up power source which can be produced at competitive costs, requires no combustible fuel and is non-polluting while running silently and constantly.

It is a further object of the invention to provide a natural energy source which has an extermely long operating life, with a maximum of operating effectiveness, component resistance to degradation, with a minimum of parts replacement and maintenance.

The various features of the invention with its basic design geometry will be more apparent from the following description and drawings which illustrate the preferred embodiment. It should be understood that variations may be made in the specific components, without departing from the spirit and scope of the invention as described and illustrated.

Several disclosure Documents have been filed with the Office which describe portions and the substance of this magnetic wheel, as follows:

Ser. No. 067,263—Permanent Magnet Wheel Drive
Ser. No. 067,917—Magnetic Wheel Drive, with Magnetic Comm.
Ser. No. 067,—Magnetic Wheel Drive, with External Power.

Referring to the Drawings:

FIG. 3 is an enlarged top view of one oscillating magnet couple.

FIG. 4 is a top, break-away view of several oscillating magnet couples connected together with linkage.

DESCRIPTION OF THE PREFERRED EMBODIMENT

Figure 1:
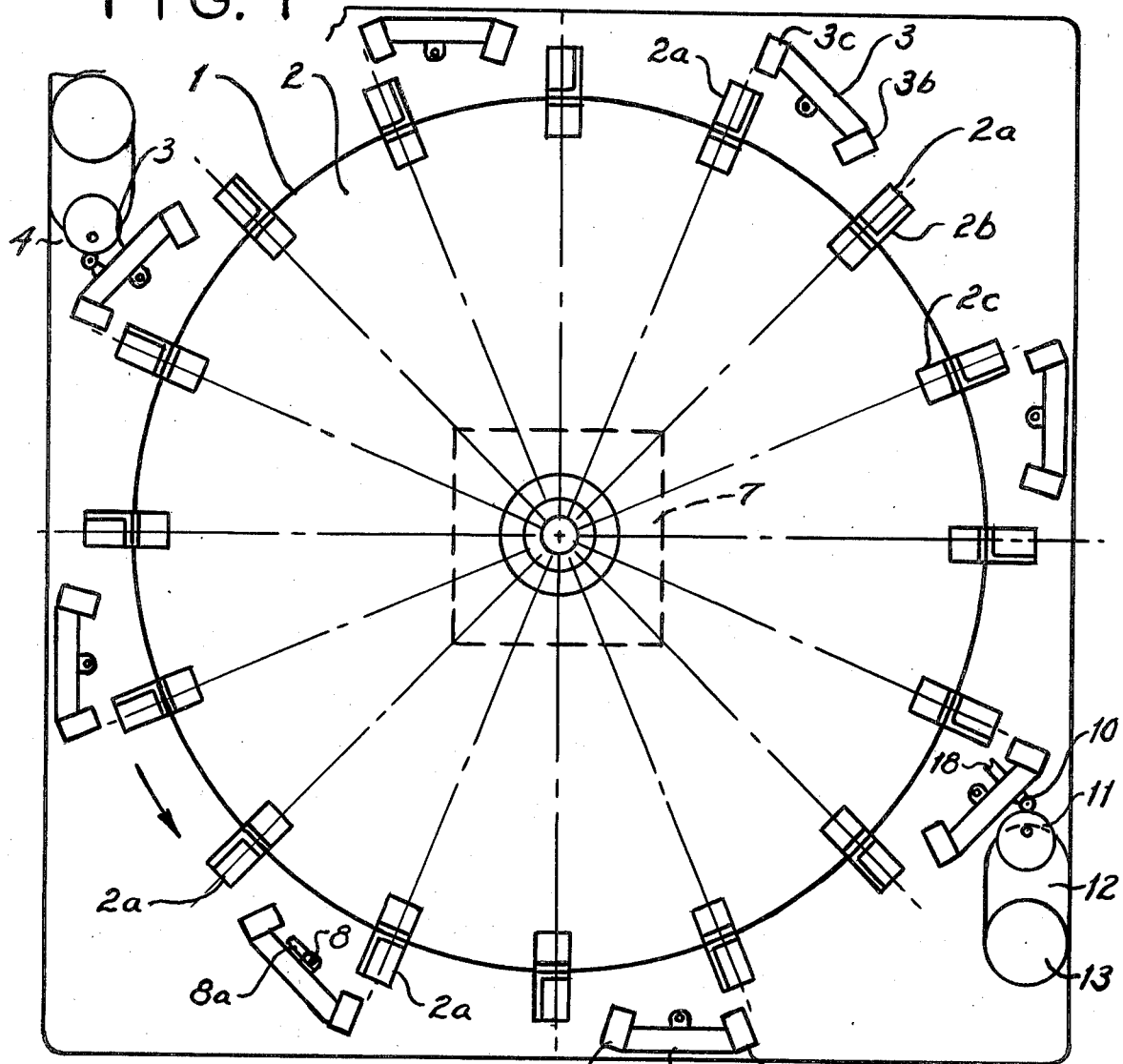
FIG. 1 is a top, external view of the magnetic wheel drive.
Figure 2:
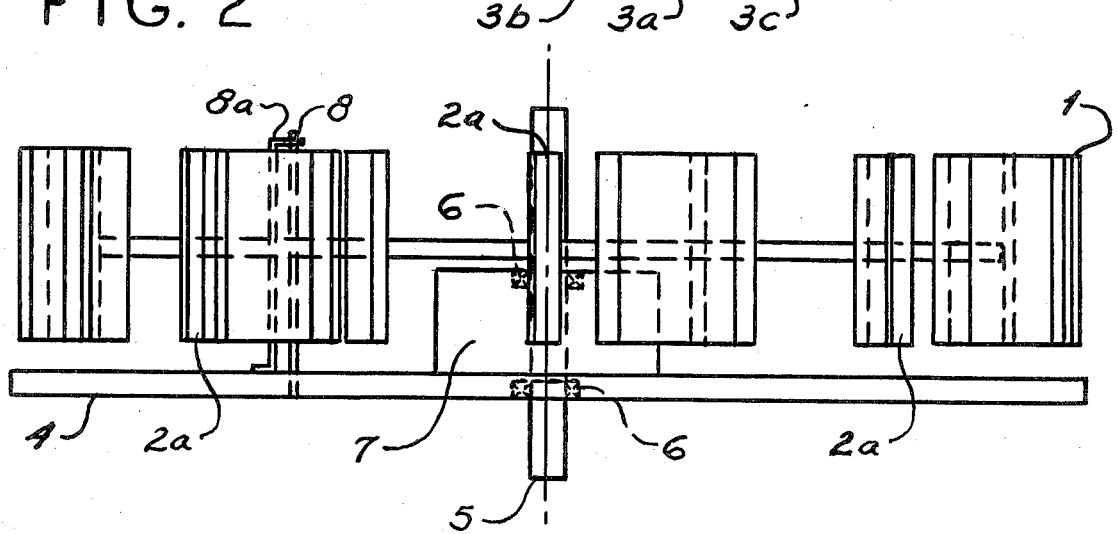
FIG. 2 is an external side view of the magnetic wheel drive.

The magnetic wheel 1, is comprised of two basic, coacting components which are a large driven wheel 2, and multiple oscillating magnet couples 3, which are closely interrelated ed, and mounted on a common base plate 4.

Multiple, identical permanent magnets 2a, are equally spaced around the periphery of the large driven wheel 2, by means of support angles 2b, and angle brackets 2c, which are secured to the wheel 2, with standard hardware.

A drive shaft 5, is fastened to the wheel 2, by means of a hub 2d, and supported by two ball bearings 6. One of the ball bearings 6, is fitted into a bore within the base plate 4, while the other ball bearing 6, is fitted into a box-base 7, which is fastened to the base plate 4, with standard hardware.

The multiple oscillating magnet couples 3, are comprised of a flat, non-magnetic oscillation plate 3a, with opposite pole magnet segments 3b and 3c, respectively, secured to the side of the flat oscillation plate 3a. Two pivot brackets 3d, are secured to the top and bottom of the flat oscillation plate 3a, which pivot the oscillation plate 3a, on the pivot rod 8. One end of the pivot rod 8, is fitted into the base plate 4, and the opposite end is supported by an elongate Z bracket 8a.

An arm 9, is fastened to a flat face of the flat oscillation plate 3a, which supports the pin 10a, which carried the ball bearing 10, as it rolls on the eccentric 11. The eccentric 11, is fastened to the slow speed shaft of the gear reduction unit 12, which is driven by the small D.C. motor 13. A return tension spring 14, is connected to the oscillation plate 3a, by means of the eyelet 3e. the opposite end of the return tension spring 14, is retained by the post 15, which is pressed into the base plate 4. The small D.C. motor(s) 13, is powered by multiple arrays of silicon photovoltaic solar cells 16, which are located at any convenient rooftop location. Electrical leads 16a, conduct solar converted electricity to the small D.C. motors 13, with the excess current stored in the batteries 16b.

The motor driven oscillation stations become the master stations for the magnetic wheel drive 1, from which about three or five slave oscillation stations are actuated. Station to station oscillation-to-reciprocating motion is transmitted by straight links 17, which are pinned to the link arms 18, which are secured to the flat oscillation plates 3a.

All of the slave oscillation stations must be precisely adjusted at the same angular attitude as the master driving oscillation station so that all stations are synchronized to allow proper functioning of the rotating wheel 2.

For very large wheels 2, with many whell magnets several master oscillation stations, with a fixed number of slave oscillation stations will be required. All of the master oscillation driving-stations will have to be electrically synchronized to maintain overall synchronization of the magnetic wheel drive 1, with all of the eccentrics 11, set at the same angular attitude at the startup of the wheel drive 1.

Either end of the drive shaft 5, may be connected with a speed step-up belt drive arrangement, which is not shown as part of this magnetic wheel drive 1.

Plastic deflectors 19, are added to either side of the oscillation plates 3a, adjacent to the opposite magnets segments 3b, and 3c, depending on the direction of rotation for the wheel 2, as an anti-jamming device for the magnetic wheel drive 1.

Magnetic field bias angles 3f nd 3g, are required for the sindes of the oscillation plates 3a, in order to assure an optimum "pull-push" sequence on the large drive wheel 2, as the magnetic oscillation couples 3, are actuated. The bias angles 3f, is matched to the magnet segment 3b, while bias angle 3g is matched to magnet segment 3c.

None of the load components which are external to the magnetic wheel drive 1, such as an electric generator or alternator are shown as a part of this invention, since a variety of load devices and arrangements are possible for the magnetic wheel drive.

What is claimed is:

1. A magnetic wheel drive comprised of two basic coacting magnetic components which are,
   a large flat non-magnetic wheel containing equally spaced identical permanent magnets secured to the outer rim of said large flat non-magnetic wheel with pole faces all exposed in the same direction.
   support angles and bracket means for securing said identical permanent magnets to the outer rim of said large flat non-magnetic wheels,
   a drive shaft secured to said large flat non-magnetic wheel by means of a central hub,
   ball bearing support means for said drive shaft, one of said ball bearings is retained in a large rectangular base plate, a second ball bearing is retained in a box-base secured to said large rectangular base plate,
   multiple identical oscillating magnet couples consisting of a rectangular flat non-magnetic plate on which opposite pole magnets are secured at the sides of said rectangular flat non-magnetic plate,
   a pivot bracket fastened to the top and bottom of said rectangular flat non-magnetic plate, a pivot rod fitted into said large rectangular base plate, the opposite end of said pivot rod supported by an elongate Z bracket secured to said large rectangular base plate,
   a support arm secured to said rectangular flat non-magnetic plate fitted with a cylindrical pin and ball bearing,
   an eccentric in direct contact with said ball bearing, said eccentric fastened to the slow speed shaft of a gear reduction unit, said gear reduction unit is driven by a small D.C. motor,
   a return tension spring fastened to said rectangular flat non-magnetic plate, retention of the opposite end of said return tension spring by a post pressed into said large rectangular base plate,
   multiple arrays of silicon solar photovoltaic cells placed at convenient outside locations for the powering of said small D.C. motors, electrical conduction means from said solar photovoltaic cells to said small D.C. motors,
   link arms fastened to some of said rectangular flat non-magnetic plates,
   straight links pinned to said link arm on most of said rectangular flat non-magnetic plates,
   connection of the end of one straight link with a link arm on one rectangular flat non-magnetic plate driven by one said small D.C. motor through said eccentric and ball bearing means.

2. A magnetic wheel drive according to claim 1, in which said identical permanent magnets are of the ceramic-barium ferrite type and of a rectangular shape and size consistent with the said large flat non-magnetic wheel size,
   said large flat non-magnetic wheel may be of any suitable size consistant with material capabiltiy and placement into standard sized building rooms,
   said drive shaft may be disposed in either a horizontal or vertical plane,
   said opposite pole magnets on said rectangular flat non-magnetic plate are identical to and line-up with said identical permanent magnets on said large flat non-magnetic wheel.

3. A magnetic wheel drive according to claim 1, wherein multiple said small D.C. motors are utilized to drive several said eccentrics in contact with said rectangular flat non-magnetic plates,
   a uniform number not to exceed nine of said link arms fastened to driven said rectangular flat non-magnetic plates,
   a uniform number not to exceed nine of said straight links pinned to said link arms on no more than nine said rectangular flat non-magnetic plates, connection of the ends of a series of no more than nine said straight links with each of said rectangular flat non-magnetic plates oscillated by said multiple small D.C. motors, electrical inter-connection and synchronization of all of said small D.C. motors.

4. A magnetic wheel drive according to claim 1, in which said multiple identical oscillating magnet couples are fitted with a series of exposed north pole magnets on one side and a series of exposed south pole magnets on the opposite side, said large flat non-magnetic wheel contains equally spaced identical permanent magnets with the relative polarity of said identical permanent magnets depending on the direction of rotation required for said large flat non-magnetic wheel, securing of said identical permanent magnets to said large flat non-magnetic wheel and said rectangular flat non-magnetic plate with non-magnetic hardware.

5. A magnetic wheel drive according to claim 1, wherein said multiple identical oscillating magnet couples can be driven at variable speeds, variation in speed of said multiple identical oscillating magnet couples oscillations by way of variations in the intensity of the illumination levels on said multiple arrays of silicon solar photovoltaic cells, electrical battery storage means for any excess of electrical energy produced from said multiple arrays of silicon solar photovoltaic cells, a sufficient number of said multiple arrays of silicon solar photovoltaic cells to provide full speed operation of said magnetic wheel drive under overcast sky conditions.

6. A magnetic wheel drive according to claim 1, wherein the full oscillation of said multiple identical oscillating magnet couples into the interference circle formed by said identical permanent magnets on said large flat non-magnetic wheel does not jam the rotation of said large flat non-magnetic wheel, multiple plastic deflector anti-jamming means mounted on each of said multiple identical oscillating magnet couples, mounting means for said multiple plastic deflection means for either direction of rotation of said large flat non-magnetic wheel.

7. A magnetic wheel drive according to claim 1, in which each side of said rectangular flat non-magnetic plate is angled at specific magnetic field bias angles, said magnetic field bias angles are opposite to each other forming a common apex opposite one face of said rectangular flat non-magnetic plate, mounting of said opposite pole magnets directly onto said magnetic field bias angles.

8. A magnetic wheel drive according to claim 1, wherein said large rectangular base plate is substantially squarish in shape and of sufficient thickness to support said magnetic wheel drive, said large rectangular base plate is of non-magnetic material, standard mounting hardware is used for the assembly of the components of said magnetic wheel drive.

9. A magnetic wheel drive according to claim 1, in which either end of said drive shaft may be utilized for the connection of a suitable speed step-up means, the connection of an electrical alternator to said magnetic wheel drive, electrical control and switching means for the electrical components of said magnetic wheel drive.

10. A magnetic wheel drive according to claim 1, wherein any type of said identical permanent magnet may be utilized including Alnico or the latest rare earth/-cobalt permanent magnets.

mounting of said identical permanent magnets on the two basic said magnetic wheel drive components with non-magnetic hardware.

* * * * *